United States Patent [19]

Tideberg

[11] Patent Number: 4,655,328
[45] Date of Patent: Apr. 7, 1987

[54] HYDRAULIC BRAKE BLEEDING APPARATUS

[76] Inventor: Robert Tideberg, 121 Post Rd., West Palm Beach, Fla. 33406

[21] Appl. No.: 708,990

[22] Filed: Mar. 7, 1985

Related U.S. Application Data

[63] Continuation of Ser. No. 429,176, Sep. 30, 1982, abandoned.

[51] Int. Cl.$^4$ .............................................. B60T 11/30
[52] U.S. Cl. ....................................... 188/352; 60/584
[58] Field of Search ........................... 60/584; 188/352

[56] References Cited

U.S. PATENT DOCUMENTS

| | | | |
|---|---|---|---|
| 2,009,433 | 7/1935 | Carroll | 188/352 X |
| 2,644,548 | 7/1953 | Schiemann | 188/352 |
| 2,670,874 | 3/1954 | Wilkerson | 188/352 X |

FOREIGN PATENT DOCUMENTS 896769 11/1953 Fed. Rep. of Germany ...... 188/352

*Primary Examiner*—Duane A. Reger
*Attorney, Agent, or Firm*—Eugene F. Malin

[57] ABSTRACT

A hydraulic fluid bleeding apparatus for removing air from a closed hydraulic brake system. The invention includes a container, a sealable lid for the container, and two conduits air tightly mounted through the lid. The first conduit includes a liquid level check valve positioned at the inner distal end within the container when the lid is secured thereto for closing off the vacuum source to the inside of the container when fluid level therein reaches a certain level. The outer distal end of the first conduit is connectable by flexible hose or the like to a vacuum source such as that within a running engine's intake manifold. The outer distal end of the second conduit is connectable to the brake system's bleed valve or petcock. The inner distal end of the second conduit is maintained at negative pressure by the vacuum condition within the container to effect brake fluid withdrawal from the bleed valve. The flexible hose, connectable between the outer distal end of the second conduit and the bleed valve, may include a transparent portion for viewing the character of the fluid flow therethrough. Alternate use of this apparatus may be a fluid pump up to the volume capacity of the container. A second alternate use may be a siphon means if the check valve is removed to allow fluid to pass through the container.

2 Claims, 2 Drawing Figures

HYDRAULIC BRAKE BLEEDING APPARATUS

This is a continuation of co-pending Ser. No. 429,176 filed Sept. 30, 1982, now abandoned.

BACKGROUND OF THE INVENTION

This invention relates generally to hydraulic systems and more particularly to a hydraulic fluid bleeding apparatus for the removal of air from a hydraulic brake system, commonly referred to as bleeding.

It is a known fact that hydraulic brake systems require the absence of air for efficient and safe operation. Air usually enters the hydraulic brake system as a result of a loss of hydraulic brake fluid, brake conduit failure, or during required brake service operations. This entrapped air must be removed.

The hydraulic brake system can be bled free of air in several ways. One commonly-known method of bleeding the hydraulic brake system is by the use of the brake system's own master cylinder to create pressure on conduits leading to each wheel and wheel cylinder by having one person apply downward force on the brake pedal causing the master cylinder to exert pressures on the conduits and wheel cylinders while another person opens the bleed valve or petcock at each wheel cylinder to expel any hydraulic fluid which includes entrapped air.

This procedure is performed on one wheel cylinder bleeder cock at a time, the pressure being lost after the opening of the bleed valve, and reestablished after the closing of the bleed valve by reapplying the brake pedal force from the inside of the car.

This system of bleeding requires two people and results in the spraying of brake fluid under pressure and subsequent loss of fluid. Further, this system of bleeding is not possible on many hydraulic brake systems because of the placement of components or height of the conduits above the height of the master cylinder that feeds the wheel cylinders the hydraulic fluid.

The hydraulic brake system can also be bled by the use of a pressure bleeder. However, the operation of a pressure bleeder requires an external source of air pressure, usually compressed air from a motor-driven air compressor. This compressed air is used to pressurize a large quantity of brake fluid housed in a movable dome. The pressurized brake fluid in this dome of the pressure brake bleeder is piped usually by a flexible hose to a temporary top cover of the brake system's master cylinder. The temporary top cover on the master cylinder seals the cover of the master cylinder and allows the pressurized fluid to enter and pressurize the entire hydraulic system.

Once the required pressure is reached, the bleed valves are opened to allow any fluid and entrapped air to be expelled. This type of bleeder system is expensive. Further, many different types of temporary master cylinder covers are necessary to service the many vehicle hydraulic systems on the market today. Also, with this system, brake fluid under pressure can be a hazzard. Any misalignment of the temporary cover or hose could result in a spray of brake fluid which is toxic and injurious to vehicle finishes.

The instant invention operates safely by means of vacuum, is low cost, very portable, lightweight, and operates under control of only one man, and can service a large variety of hydraulic brake systems. This invention also has a capability of storing bleed-off fluid for reuse.

BRIEF DESCRIPTION OF THE INVENTION

A hydraulic fluid bleeding apparatus for removing air from a closed hydraulic brake system. The invention includes a container, a sealable lid for the container, and two conduits air tightly mounted through the lid. The first conduit includes a liquid level check valve positioned at the inner distal end within the container when the lid is secured thereto for closing off the vacuum source to the inside of the container when fluid level therein reaches a certain level. The outer distal end of the first conduit is connectable by flexible hose or the like to a vacuum source such as that within an engine intake manifold. The outer distal end of the second conduit is connectable to the brake system's bleed valve or petcock. The inner distal end of the second conduit is maintained at negative pressure by the vacuum condition within the container. The flexible hose, connectable between the outer distal end of the second conduit and the bleed valve, may include a transparent portion for viewing the character of the fluid flow therethrough. Alternate use of this apparatus may be a fluid pump up to the volume capacity of the container. A second alternate use may be a siphon means if the check valve is removed to allow fluid to pass through the container.

It is an object of this invention to provide an inexpensive means for bleeding air from a closed hydraulic system such as found in a vehicle's braking system.

It is another object of this invention to provide a safe vacuum-actuated closed hydraulic bleeding apparatus having no positive pressure, large or otherwise, within the system which could cause injurious hydraulic fluid to spray from a leaking connection.

It is yet another object of this invention to provide a hydraulic bleeding apparatus operable by only one person.

It is still another object of this invention to provide an apparatus as above which may also be used alternately as a siphon or as a limited-capacity pump.

In accordance with these and other objects which will be apparent hereinafter, the instant invention will now be described with particular reference to the accompanying drawings.

PREFERRED EMBODIMENT OF THE INVENTION

Figure 1:
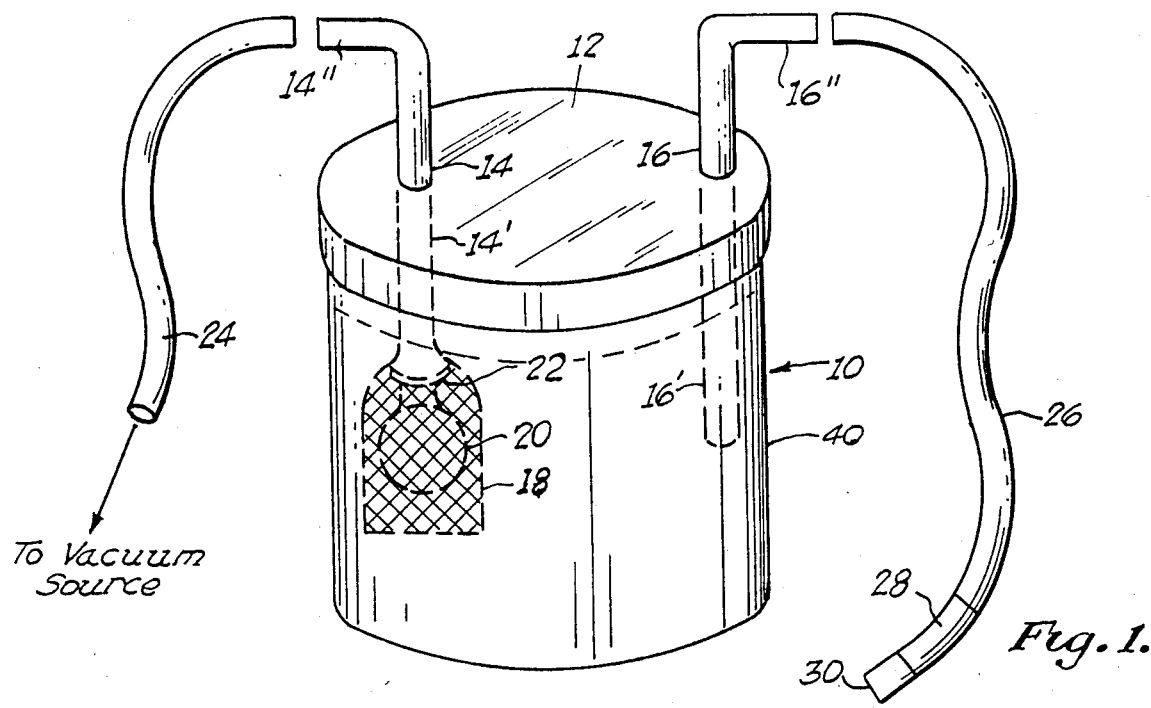
FIG. 1 is a perspective view of the invention.

Referring now to the drawings, and particularly to FIG. 1, the invention 10 includes a container 40 having a mating sealable lid 12. The lid 12 includes two conduits 14 and 16 mounted through the lid such as to maintain airtight integrity from one side of the lid to the other.

The inner distal end 14' of the first conduit 14 has attached thereto a floatable check ball 20 housed in a screen cage 18 attached to the conduit's distal end. The outer portion of this first conduit 14" is connectable to a vacuum source. The second conduit 16 is connectable at its outer portion 16" to the hydraulic system to be bled by a flexible tube 26 which includes a suitable end fitting 30 and a transparent portion 28. The transparent portion 28 allows the user to view fluid and/or air passing into the container 40 to determine when to stop the bleeding process as determined by lack of air in the fluid.

Should the bleeding process continue for a time sufficient to substantially fill the container as indicated by indicia on the side of a transluscent or transparent container, the check ball or one way air valve means 20 will float in the fluid, blocking opening 22 in the first conduit 14. This blockage has the effect of preventing fluid from being drawn into the first conduit and into the vacuum source which may be the intake manifold of an internal combustion unique.

Figure 2:
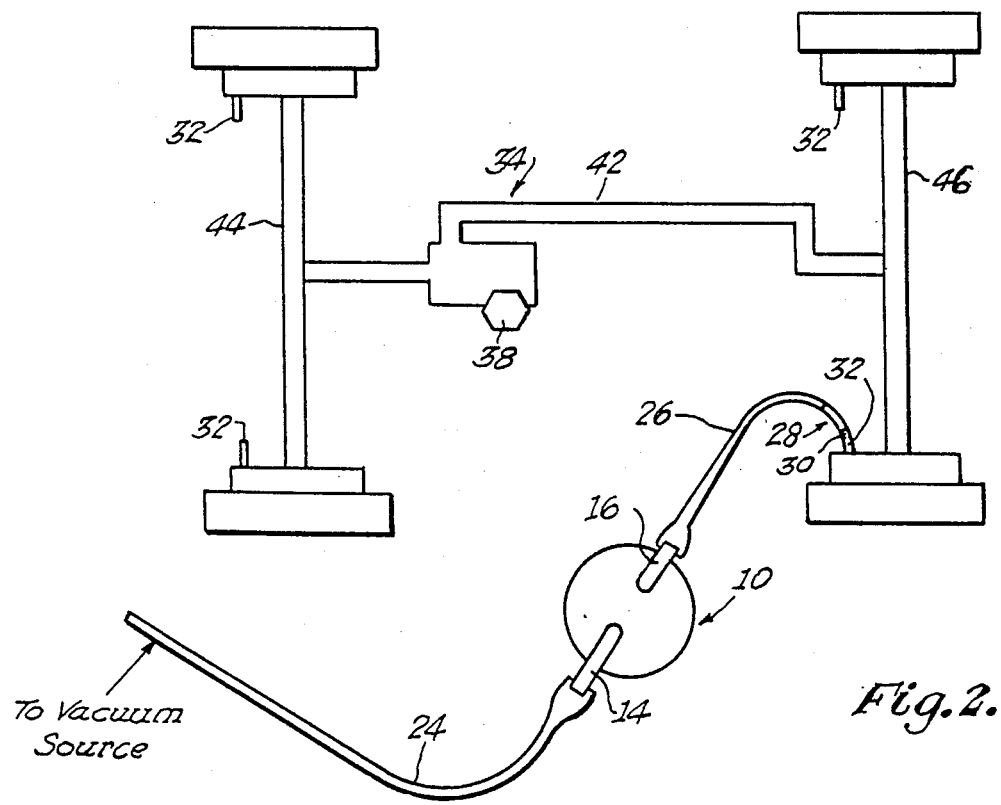
FIG. 2 is a schematic diagram of the invention interconnected to a vehicle.

This apparatus 10 is shown in FIG. 2 interconnected to a vehicle's hydraulic braking system 34, the preferred use of this apparatus. The vehicle's braking system includes a master cylinder 36 having a sealable top 38. This master cylinder holds the system's reserve supply hydraulic fluid. Top 38 must be open during the bleeding process to allow fluid to flow through the hydraulic lines 42, 44, and 46 to bleed valves or petcocks 32 to which end fitting 30 is connected serially to each bleed valve 32 in the system. The vacuum or negative pressure, created within the container 10 by interconnecting flexible hose 24 between the first conduit 14 and any available fitting in the running engine's intake manifold as the preferred vacuum source, causes brake fluid mixed with the undesirable air in the fluid lines of the vehicle's braking system to be drawn into the container 10 through conduit 16. When visual observation of the physical character of the fluid flow through transparent segment 28 shows only air-free fluid flow, the bleeding process is discontinued by disconnecting tube 24 from the intake manifold.

Two alternate uses for this same apparatus (not illustrated) are also disclosed herein. The first alternate use for the device is in the siphoning of fluids. After fluid is made to flow by vacuum suction into the container 10 which is slightly lower than the to-be-siphoned liquid level, the vacuum source may be disconnected from flexible base 14 allowing fluid to not only flow into and fill container 10, but also to flow out of hose 14 into another separate container. This use requires elimination of the removable check ball 20. The second alternate use for this apparatus is to transfer limited amounts of fluid into container 10 without physical contact of the transferred liquid by a pump or the like. Here, too, the moving force is the vacuum created inside the container 10.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A vehicle's hydraulic fluid brake line system bleeding apparatus for removing air trapped within the hydraulic fluid lines, in a vehicle having a braking system with at least one bleed valve and used with an available vacuum source, said apparatus comprising:

a container having an opening;

a lid sealably attachable to said opening of said container;

said lid and said container forming an airtight chamber within said container when said lid is sealably attached to said opening of said container;

said lid including a first conduit means therethrough and a second conduit means therethrough;

said first conduit means having an outer portion connectable to said vacuum source, said first conduit means for transporting air out of said container;

said second conduit means having an outer portion connectable to the bleed valve in the hydraulic fluid lines, said second conduit means for transporting hydraulic fluid and air into said container, one way air valve means for preventing hydraulic fluid from said second conduit means from escaping from said airtight chamber out through said first conduit when the hydraulic fluid in said container reaches a certain level, said one way air valve means for passing only air to the vacuum source, said one way air valve means remains open under all other conditions, said one way air valve means including a screen cage with a floatable check ball movable therein from a lower position to a higher position by hydraulic fluid in said chamber.

2. A brake system bleeding apparatus as set forth in claim 1, further comprising:

a transparent conduit segment connected between said outer portion of said second conduit and the bleed valve;

said transparent conduit segment for viewing the liquid flowing therethrough to determine presence of air trapped in the fluid.

* * * * *